Jan. 16, 1968 M. HOERER 3,363,617
ROTARY SEGMENTAL SAW WITH RIM RIGIDIFYING AND SILENCING MEANS
Filed Aug. 28, 1964 2 Sheets-Sheet 1
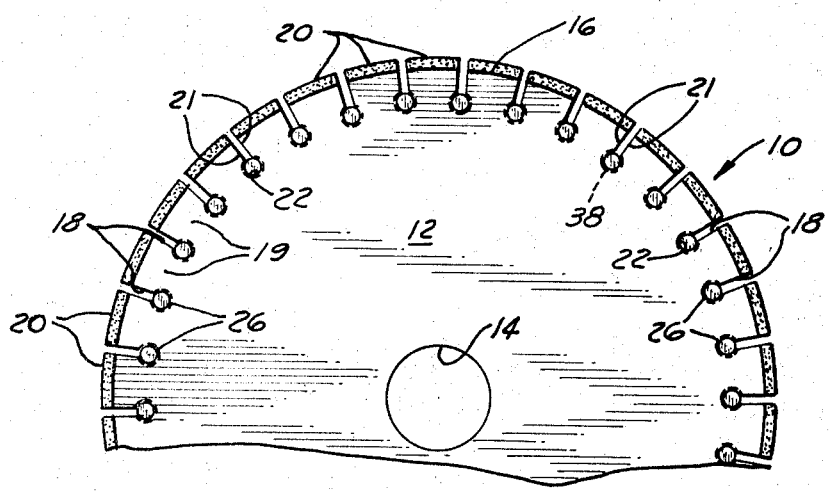
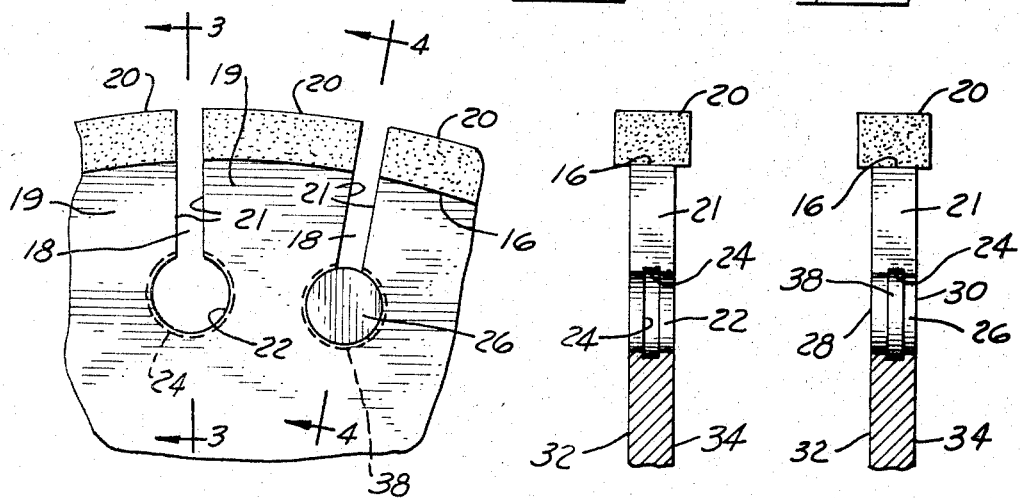
INVENTOR.
MARTIN HOERER
BY
ATTORNEY Jan. 16, 1968  M. HOERER  3,363,617
ROTARY SEGMENTAL SAW WITH RIM RIGIDIFYING AND SILENCING MEANS
Filed Aug. 28, 1964  2 Sheets-Sheet 2
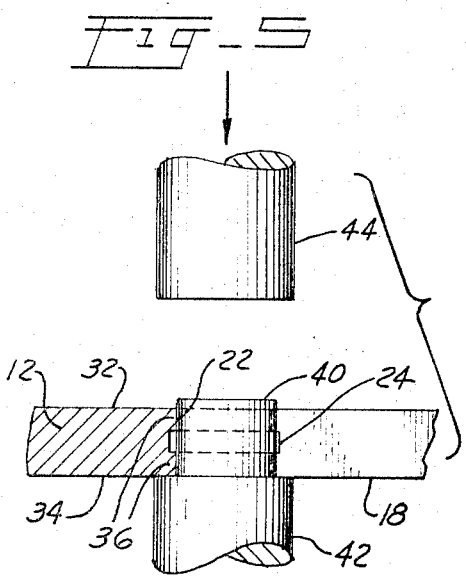
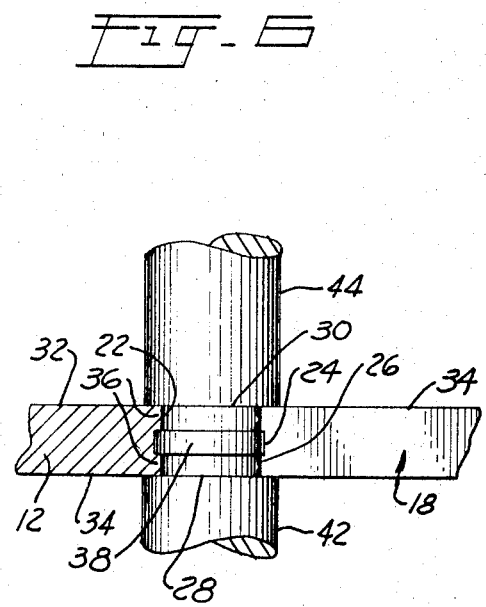
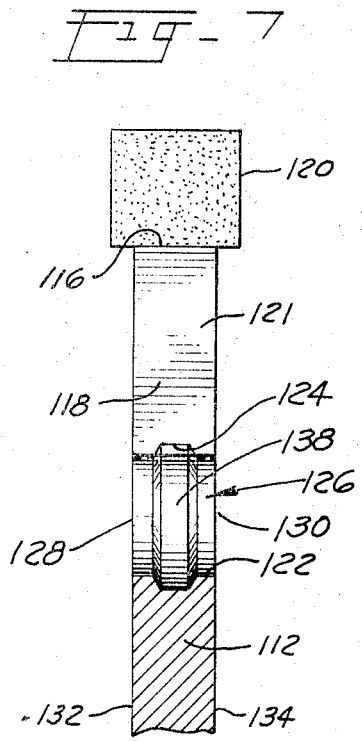
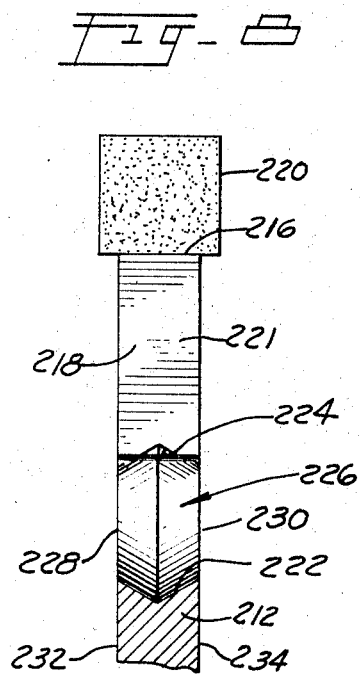
INVENTOR.
MARTIN HOERER
BY
ATTORNEY

United States Patent Office 3,363,617
Patented Jan. 16, 1968

3,363,617
ROTARY SEGMENTAL SAW WITH RIM
RIGIDIFYING AND SILENCING MEANS
Martin Hoerer, Highland Park, Ill., assignor to Super-Cut,
Inc., Chicago, Ill., a corporation of Illinois
Filed Aug. 28, 1964, Ser. No. 392,821
2 Claims. (Cl. 125—15)

The present invention relates to rotary stone cutting saws of the type which is commonly employed for sawing limestone, marble, granite and the like and embodies, for stone cutting purposes, a series of peripheral, circumferentially spaced, abrasive segments in the form of metallic matrices with crushed or fragmented diamonds or other abrasive particles distributed throughout the same. A rotary stone cutting saw of such type involves in its general organization a flat-sided, circular, disk-like saw body or blade which is ordinarily formed of steel, embodies a central arbor hole, and has the abrasive segments applied to its periphery by a soldering, brazing or other similar operation involving the application of heat. A saw of this general character is shown and described in United States Patent No. 2,990,828, granted to me on July 4, 1961, and entitled, "Rotary Segmental Saw With Rim Rigidifying and Silencing Means." The stone cutting saw constituting the present invention is an improvement upon and embodies certain inherent advantages over the saw of said patent.

Specifically, the present invention is concerned with a rotary stone cutting saw of the aforementioned type and in which the circular saw blade is provided with a series of elongated, radially and inwardly extending, circumferentially spaced slots in the peripheral or rim region thereof, the inner ends of the slots terminating in circular enlargements which are filled with circular metallic plugs under compression. As explained in my Patent No. 2,990,828, the presence of such slots and plugs has a three-fold purpose. Firstly, in applying the diamond-containing abrasive segments to the periphery of the saw blade between adjacent slots, the heat which is applied during soldering or brazing of the segments to the metal between adjacent slots is isolated and dissipated at the sides of said adjacent slot so that circumferential thermal expansion of the saw blade and consequent buckling of the rim region of the saw blade is avoided. Secondly, the filling of the enlargements with metallic plugs under compression rigidifies or stiffens the entire rim region of the saw blade and also prevents cracking of the metal near the bases of the slots when the saw blade is put to use. Thirdly, the presence of compressed metal within the enlargements at the bases or inner ends of the slots excludes the presence of air which has the necessary elasticity to support a condition of resonance that results in objectionable "whistling" of the saw when the same is put into use or service. These phenomena have been fully elaborated upon in my aforementioned patent and reference may be had thereto for a full understanding of their causes and effects and of the manner in which the filling of the enlargements at the bases of the peripheral slots has resulted in long saw life and improved saw operation.

While the rotary stone cutting saw of my prior patent, above referred to, has proven satisfactory in use in that it accomplishes its intended aims, it has, nevertheless, exhibited one limitation which it is the aim of the present invention to overcome. This limitation is a result of the method that is employed in installing the filler plugs within the enlargements at the bases or inner ends of the slots in the rim region of the blade. Heretofore, these filler plugs which originally are in the form of cylindrical disks have been expanded in the enlargements by suitable pressing dies on opposite sides of the saw blade. In order to lock or retain the plugs within the enlargements, the end edges of the enlargements have been bevelled or countersunk so that when the plugs are "mashed," so to speak, within the enlargements, the metal at the end of the plugs flows into the bevelled areas on opposite sides of the blade, thus creating small frusto-conical lips or flanges which lock the plugs in position within the circular openings which constitute the enlargements at the inner ends of the slots.

Since the large bases of these frusto-conical retaining lips or flanges are presented outwardly, i.e., away from each other in opposite directions, thin edges are created in the respective planes of the sides of the saw blade. Occasionally, an imperfect filler plug will contain an excess of metal with the result that when the plug is flattened or mashed within its respective enlargement, the resulting thin edges will flatten and spread over the side faces of the blade. Thus, when the blade is put to use, it is possible for sludge to enter between the metal of the plug and the blade and lift the film of metal from the blade and gradually work its way into the enlargement and loosen the plug. Still further, any blade, when put into prolonged service, will, due to the frictional drag that is offered by the sludge in the kerf undergoing cutting, wear thin in the peripheral or rim region thereof. Thus, it frequently happens that after a predetermined degree of wear, the frusto-conical retaining lips or flanges will wear away and the plugs may then fall out.

Another limitation that is attendant upon the construction and use of the rotary stone cutting saw of my above-mentioned patent resides in the necessity of making the saw blade sufficiently thick to accommodate the provision of effectively deep countersinks on opposite sides of the enlargements. Unless these countersinks are of appreciable depth, they will wear away at a comparatively early stage in the life of the saw blade and their locking effect on the filler plugs will be lost.

The present invention is designed to overcome the above noted limitations that are attendant upon the construction and use of a rotary stone cutting saw of the type that is shown in my aforementioned patent and, accordingly, the invention contemplates the provision of a novel method of installing the metallic or other filler plugs in the enlargements at the bases or inner ends of the radial slots in the blade, whereby neither an excess of metal in the original plugs nor prolonged wear on the sides of the saw blade will loosen the plugs, provided, of course, that such wear does not exceed the tolerable amount of wear ordinarily permitted a conventional saw blade. Additionally, the method contemplated by the present invention is conducive toward the provision of a thinner saw blade than has heretofore been possible where countersinks are provided. The invention further contemplates the provision of a rotary stone cutting saw which is possessed of novelty by reason of the method that is involved in constructing it, and is also possessed of an extended useful life due to prolonged retention of the filler plugs in position within their respective enlargements.

The provision of a rotary stone cutting saw as briefly outlined above being among the principal objects of the invention, numerous other objects and advantages will readily suggest themselves as the nature of the invention is better understood.

In the accompanying two sheets of drawings forming a part of this specification, several illustrative embodiments of the invention are shown.

In these drawings:

FIG. 1 is a fragmentary side view of a composite segmental rotary stone cutting saw constructed in accordance with the principles of the present invention and with certain parts removed in the interests of clarity;

FIG. 2 is an enlarged fragmentary side view showing a peripheral or rim portion of the saw of FIG. 1 and with certain parts removed in order more clearly to reveal the nature of the invention;

FIG. 3 is a transverse sectional view taken on the line 3—3 of FIG. 2;

FIG. 4 is a transverse sectional view taken on the line 4—4 of FIG. 2;

FIG. 5 is a fragmentary sectional view, somewhat schematic in its representation, of a pair of installation dies and showing the same in position preparatory to effecting their shaping operation upon a filler plug that is employed in connection with the invention;

FIG. 6 is a fragmentary sectional view similar to FIG. 5 but showing the dies in their final forming position;

FIG. 7 is a sectional view similar to FIG. 4 but showing a modified form of the invention; and FIG. 8 is a sectional view similar to FIGS. 4 and 7 but showing another modified form of the invention.

Referring now to the drawings in detail and in particular to FIGS. 1 to 4, inclusive, wherein one embodiment of the invention is shown, a composite segmental rotary stone cutting saw is designated in its entirety by the reference numeral 10 and it comprises a saw body or blade 12 in the form of a substantially flat, circular, disk-like body of metal, preferably steel, having the usual central arbor opening 14 formed therein. Rotary stone cutting saws of the type with which the present invention is concerned are made in various sizes ranging in diameter from a matter of inches to ten or more feet, with the thickness of the blade increasing commensurately with the blade diameter.

The circular peripheral or rim region 16 of the blade 12 is interrupted at spaced regions therearound by a series of inwardly extending, elongated, equally spaced slots 18, the axes or longitudinal center lines of which extend radially of the blade. The intervening portions 19 of the blade, i.e., the peripheral portions which exist between adjacent pairs of slots, carry at their outer margins a series of cutting or abrasive segments 20 which are in the form of metal matrices throughout which there are distributed quantities of crushed or fragmented diamonds or other abrasive particles. The abrasive segments are of elongated rectilinear block-like design with each segment preferably, but not necessarily, spanning the distance between an adjacent pair of slots. The segments are slightly wider than the thickness of the metal of the blade 12 and are centered in position on the outer margins of the intervening blade portions 19 so that the side faces thereof are offset laterally outwardly from the general planes of the side faces of the blade. The segments are secured in position on the interrupted rim 16 of the blade 12 by a suitable soldering, brazing, or similar operation involving the application of heat. The nature of the abrasive elements per se and their mode of application to the rim 16 of the blade 12 form no part of the present invention and no claim is made herein to any novelty associated with the same. Although these segments 20 are shown as being rectilinear in their design and comprised solely of metal matrices with the diamond material distributed throughout the same, the segments may be of a composite nature and embody the principles set forth in United States Patent No. 3,122,030, granted on Feb. 25, 1964, and entitled, "Method of Assembling a Rotary Saw Blade With Peripheral Diamond Teeth," or they may be otherwise constructed.

The side walls 21 of the slots 18 preferably extend in parallelism (see FIG. 2) and the inner ends of the slots terminate in substantially semi-circular openings or enlargements 22 which, in all of the illustrated forms of the invention, are of a diameter somewhat greater than the width of the slots. The arcuate extent of the substantially semi-circular enlargements is thus slightly in excess of 180°.

The depth, i.e., the radial extent, of the slots 18 is not critical within limits nor is the width or the number of slots. For example, a blade having a diameter of twenty-four inches may be provided with thirty-six spaced slots which are seven-eighths of an inch in depth and three-sixteenths of an inch wide. Irrespective, however, of the size, shape or number of slots employed, the essential features of the invention are at all times preserved.

As shown in FIGS. 2, 3, and 4, the arcuate wall 23 of each enlargement 22 is provided with a centrally disposed substantially annular groove 24, and each enlargement has disposed therein a generally circular or cylindrical filler plug 26 which completely fills the enlargement and the associated groove 24 and has its opposite planar end faces 28 and 30 lying precisely in the planes of the side faces 32 and 34 of the blade 12. Each plug is inserted into its associated or respective enlargement by an expanding operation as will be described in detail presently.

The various filler plugs 26 are formed of a relatively soft metal such, for example, as copper, and they exist under compression within the enlargements which they fill. Each annular groove 24 establishes on opposite sides thereof two spaced apart inwardly directed ribs or flanges 36 which interlock with the external or outwardly extending annular rib 38 which is formed on the associated filler plug 26 and exists by reason of the flow of the copper metal of the plug into the groove at the time that the plug is expanded or compressed in the groove. The ribs 36 prevent axial removal of the filler plugs 26 from the enlargements 22.

The filler plugs 26 may be applied to the blade 12 by a pressing operation as schematically illustrated in FIGS. 5 and 6, a cylindrical metal slug 40 being positioned in each enlargement 22 to be filled and operated upon by lower and upper pressing dies 42 and 44 to compress the metal of the slug and cause the same to fill the cavity existing by reason of the enlargement 22. The quantity of metal that is contained in each slug 40 is substantially equal in volume to the volume of the cavity existing by reason of the enlargement 22 so that the dies 42 and 44 exert a simulated riveting operation upon the slug while at the same time causing the cylindrical slug to expand radially within the circular enlargement 22 and into intimate face-to-face contact with the entire wall surface area of the latter including that of the groove 24. As stated above, the provision of the grooves 24 and their associated side flanges or ribs 36 serves to lock the filler plugs 26 securely within the enlargements 22 against lateral dislodgment when the saw 10 is put into service.

In the manufacture of the saw 10, the slugs 40 are, insofar as is practicable, constructed so that they will completely fill the enlargements after they have been pressed thereinto as previously described, with no excess of metal.

However, due to limitations in the manufacture of the slugs, occasionally a slug will contain a slight excess of metal so that after it has been pressed into a particular enlargement 22, the excess metal will exhibit itself as a thin web of material on either side or both sides of the saw blade immediately surrounding the enlargement. In such an instance, the excess metal may be removed by a grinding operation. However, in order to preclude the possibility of excess metal on the outer sides of the saw blade, it is contemplated that the slugs 40 may be made with a very slight deficiency of metal so that the largest oversized plug likely to be encountered will contain enough metal to just fill the enlargement. In other words, a slightly undersized slug pattern will be employed, and in such an instance, such normal slugs as accrue from the pattern will, upon compression thereof by the installation dies 42 and 44, to all outward appearances, completely fill the enlargements 22 but will in reality leave an almost infinitesimal void or voids within the annular grooves 24. The efficiency of the interlock between the ribs 36 on the blade 12 and the ribs 38 on the plugs will not be disturbed. In this manner, the end faces 28 and 30 of the filler plugs 26 will lie flush with the side faces 32 and 34 of the blade 12 and no subsequent grinding operations will be required.

The substantially semi-circular enlargements 22 at the inner ends of the various slots 18 serve to prevent fracture of the blade at the bases of the slots, such fracture being a common occurrence in the absence of such enlargements. The increased linear extent of the slots in the base regions afforded by the enlargements 22 distributes the stress and strain of flexing between adjacent intervening blade portions 19 over a larger linear extent of the saw blade 12 so that these portions may "flutter" laterally in one direction or the other, as they usually do when the saw is in service without severely localizing the points of metal stress at the extreme bases of the slots where the adjacent portions 19 are joined together.

In the absence of the compressed metallic filler plugs 26, it has been found that there is a tendency for extreme noise to occur when the saw is placed in service. Such noise is in the nature of a relatively loud howl or whistle and it is believed to exist by reason of the resonance of air within the individual openings that are created by the enlargements. It is further believed that the circumferential sweep of the individual air pockets through the ambient atmosphere sets up not only resonant air vibrations which have a frequency within the audible range, but also harmonic vibrations of a supersonic nature and of extremely high frequency which, when absorbed by the surrounding metal of the blade, sets up internal vibrations therein which may affect the crystal structure of the alloy steel and further enhance the creation of cracks in the vicinity of the slots. The existence of the metallic filler plugs 26 within the enlargements completely displaces the air within the latter so that the source of vibration is eliminated, thus resulting in a saw which is devoid of objectionable noise and stress factors. What is equally as important is the fact that the various filler plugs 26 exist under compression within the enlargements 22 which they completely fill. Thus, due to the outward pressure of the filler plugs against the wall surfaces of the enlargements, the rim region of the blade 12 is placed under an increased degree of compression and is thus rigidified or stiffened, so to speak, so that proper blade tension will be maintained at all times with no buckling of the blade rim.

In FIG. 7, a slightly modified form of the invention is shown. In this form of the invention, the saw blade 112 and the filler plugs 126 remain substantially the same as in the previously described form of the invention with the sole exception that the grooves 124 in the otherwise arcuate walls 123 of the enlargements 122 have inwardly converging side walls 127 instead of side walls or side flanges which extend in radial planes. As a consequence, the annular ribs 138 which are formed on the plug-forming slugs during the pressing operation assume a complementary shape as shown in FIG. 7, the plugs 126 substantially filling the enlargements 122. Due to the similarity of construction, and to avoid needless repetition of description, similar reference characters but of a higher order have been applied to the corresponding parts as between FIGS. 4 and 7.

In FIG. 8, a further modified form of the invention wherein the substantially semi-circular grooves 224 are of full saw blade width and are in the form of V-troughs. The filler plugs 226 thus assume a complementary V shape. Again, to avoid needless repetition of description, similar reference numerals of a still higher order have been applied to the corresponding parts as between FIGS. 4 and 8.

In the operation of either of the forms of the blade shown in FIGS. 7 and 8, interlocking ribs on the blade and filler plugs serve effectively to retain the filler plugs within their respective enlargements. Otherwise, the construction of the saw blades and the method of installation of the filler plugs remain substantially the same as in the form of the invention shown in FIGS. 1 to 4, inclusive.

Several additional forms of the invention have been contemplated, but require no illustration herein since they involve no appreciable structural changes in the forms of the invention already illustrated. These forms of the invention involve merely the use of plastic filler plugs in place of the copper filler plugs 26, 126 and 226 that are shown in FIGS. 2, 7 and 8, respectively.

Many plastic materials are available and suitable for use as filler plugs and among these are a wide variety of thermoplastic or thermosetting phenol formaldehyde condensation products, epoxy resins and the like. These plastic filler plugs may assume any of the forms of filler plugs shown in FIGS. 2, 7 and 8, or other modified forms contemplated within the scope of the present invention. Where such plastic filler plugs are concerned, they may be installed in the enlargements at the base of the slots in the saw blade by suitable flowing operations, with or without the application of heat. The plastic filler plugs are effective for noise suppression purposes as is the case in connection with the use of copper or other metallic filler plugs, but due to their lack of appreciable resistance to compressional forces, their use has little effect in rigidifying the peripheral regions of the saw blade.

The invention is not to be limited to the exact arrangement of parts shown in the accompanying drawings or described in this specification as various changes in the details of construction may be restorted to without departing from the spirit or scope of the invention. Therefore, only insofar as the invention has particularly been pointed out in the accompanying claims is the same to be limited.

Having thus described the invention what I claim as new and desire to secure by Letters Patent is:

1. A rotary segmental stone cutting saw of the character described and comprising, in combination, a substantially flat disk-like circular metallic saw blade, the circular rim of which is interrupted by a series of inwardly extending elongated radial slots which present parallel side wall surfaces and are spaced in a circumferential direction so as to define therebetween intervening blade portions, the inner end of each slot being formed with a substantially semi-circular enlargement of a diameter greater than the distance between the parallel side wall surfaces of the slot and the arcuate extent of which is slightly in excess of 180°, the curved wall surface of each enlargement being formed with a narrow groove therein which follows the substantially semicircular contour of the enlargement coextensively, each groove being spaced inwardly from the sides of the saw blade and defining on opposite sides thereof a pair of radially inwardly directed retaining flanges, filler plugs formed of a material which is softer than that of the blade, and disposed within the enlargements and effectively filling the same including the grooves therein, said filler plugs being formed of a metal having an appreciable degree of resistance to compressional forces and being disposed in the enlargements under compression so as to exert a spreading force upon the adjacent blade portions and thus rigidify the saw blade as a whole, said filler plugs, by reason of their conformity with the curved wall surfaces of their respective openings presenting substantially semicylindrical end regions, the outer end faces of each filler plug being flush with the side faces of the saw blade, and an elongated cutting element abutting against, bonded to, and extending circumferentially of the blade rim between each pair of adjacent slots.

2. A rotary segmental stone cutting saw as set forth in claim 1 and wherein each groove is rectangular in transverse cross section.

References Cited

UNITED STATES PATENTS

| | | | |
|---|---|---|---|
| 231,231 | 8/1880 | Klein | 29—522 |
| 2,804,679 | 9/1957 | Tracy | 29—522 X |
| 2,958,758 | 11/1960 | Snell | 29—522 |
| 2,990,828 | 7/1961 | Hoerer | 125—15 |
| 3,107,706 | 10/1963 | Heinemann | 143—137 |

FOREIGN PATENTS 95,392    1/1898    Germany.

HAROLD D. WHITEHEAD, *Primary Examiner.*

N. H. GERLACH, L. M. SWINGLE, *Examiners.*